J. F. G. KROMSCHROEDER.
Carburetors.

No. 137,307.  
2 Sheets--Sheet 1.  
Patented April 1, 1873.

Witnesses  
Inventor

J. F. G. KROMSCHROEDER.
Carburetors.

Patented April 1, 1873.

Witnesses

Inventor

UNITED STATES PATENT OFFICE.

JOHN F. G. KROMSCHROEDER, OF GLOUCESTER STREET, REGENT'S PARK, ENGLAND.

IMPROVEMENT IN CARBURETERS.

Specification forming part of Letters Patent No. 137,307, dated April 1, 1873; application filed October 1, 1872.

*To all whom it may concern:*

Be it known that I, JOHN FREDERICK GUSTAVE KROMSCHROEDER, of Gloucester street, Regent's Park, in the county of Middlesex, England, engineer, a subject of the Emperor of Germany, have invented or discovered new and useful Improvements in Apparatus for Generating Inflammable Gas or Vapor for Heating and Lighting Purposes; and I, the said JOHN FREDERICK GUSTAVE KROMSCHROEDER, do hereby declare the nature of the said invention, and in what manner the same is to be performed, to be particularly described and ascertained in and by the following statement thereof—that is to say, My invention has for its object to improve apparatus for producing inflammable gas or vapor by passing a stream of air through wool or other absorbent material saturated with liquid hydrocarbon. For this purpose I employ, by preference, an arrangement of air-forcing apparatus driven by clock-work, and around the casing containing the air-forcing apparatus I form an outer casing. The space between the two I form into a reservoir for containing a supply of liquid hydrocarbon. The vaporizing-chamber is below the chamber containing the air-forcing apparatus, and, in order to maintain an equal supply of hydrocarbon in the vaporizing-chamber, I supply such vaporizing-chamber from the reservoir by a bird-fountain arrangement. For this purpose there is an inlet-pipe passing from the lower part of the reservoir into the vaporizing-chamber, and also an air-pipe passing from the vaporizing-chamber to the top of the reservoir. When the level of the liquid is below the open end of the air-pipe in the vaporizing-chamber, air passes from such chamber into the reservoir and allows liquids to flow therefrom into the vaporizing-chamber until the level of the liquid therein rises above the bottom of the air-pipe. The vaporizing-chamber is divided by partitions or divisions so as to form it into a circuitous channel, and this channel contains wool or absorbent material. I prefer that the vaporizing-chamber should be divided by a spirally-formed division, and I admit the current of air by preference to the center of such vaporizing-chamber, and draw it off at the circumference after it has permeated through wool or absorbent material contained therein. An effectual saturation of the air with inflammable vapor is thus obtained. The vaporizing-chamber I also surround with a thick jacket or coating of non-conducting material to protect it from the influence of external temperature.

When the apparatus is to be used on board ship I suspend it on gimbals, so as to maintain it in a horizontal position, or nearly so, and thereby prevent the hydrocarbon in the vaporizing-chamber from splashing about or flowing from one side to another, and so producing irregularity in the working of the apparatus. I prefer for this purpose to connect two opposite sides of the apparatus by axes or ball-and-socket joints with a frame, which itself is suspended by a ball-and-socket joint at its upper end.

In order that my said invention may be most fully understood and readily carried into effect, I will proceed to describe the drawing hereunto annexed.

Description of the Drawing.

The arrangement of these diaphragms is shown by the horizontal section, Fig. 2, which is taken at the line 1 1, Fig. I. The cylindrical body of the apparatus is here divided into three compartments by the fixed partitions $f^1$, $f^2$, and $f^3$, and these are each subdivided by a flexible partition, $g$. These partitions are each formed of four triangular metal flaps connected together with leather, and all the flaps are linked to arms $e^x$ fixed upon the vertical axes $e^2$. The axes $e^2$ enter the outer chamber by stuffing-boxes. There is thus in the body of the apparatus six chambers of varying capacity, and each is connected, by an air-way, to a port or passage in the valve-seat $h$, of which

Figure 1:
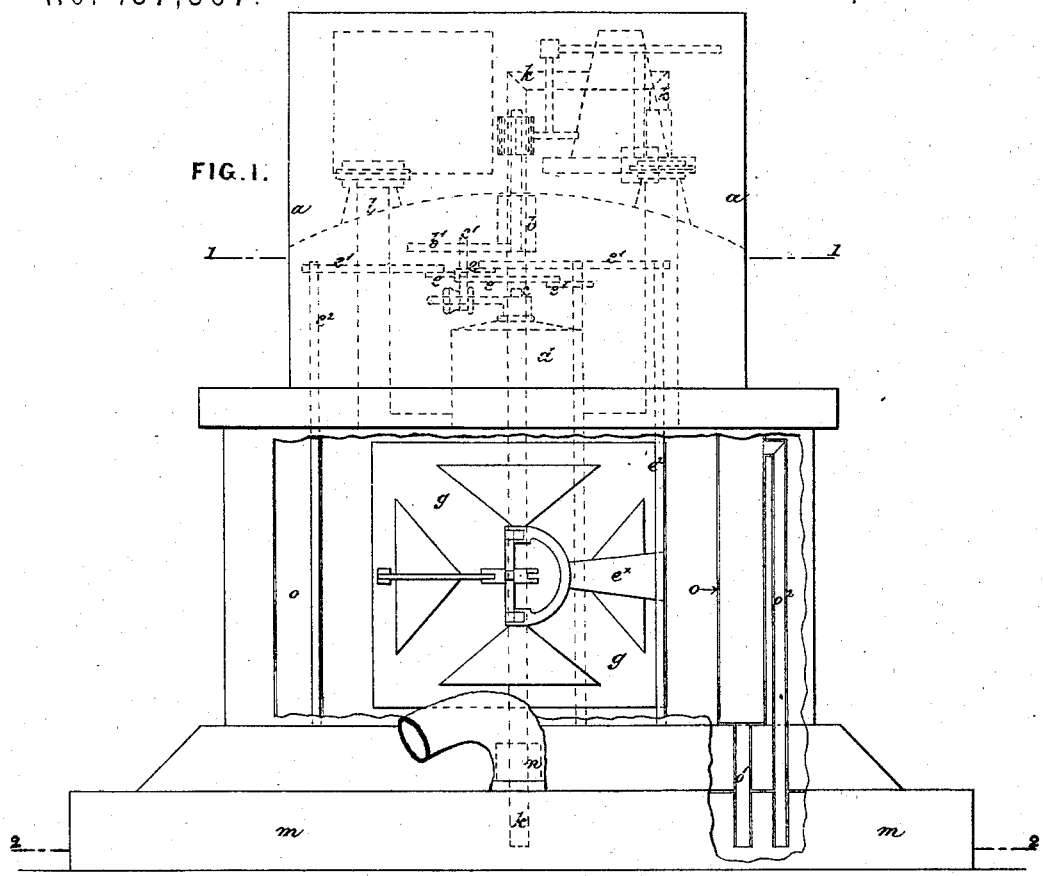
Figure 1 is a side view, partly in section, of the machine. $a\,a$ is a case at the top of the instrument containing clock-work, which drives the vertical axis $b$. $b'$ is a slotted arm on this axis receiving a pin, $c'$, on a crank-arm fixed on the lower vertical axis $c$. The axis $c$, which is thus driven, turns in a stuffing-box or bearing at the top of the valve-chamber $d$. The crank-pin $c'$ is connected by links $e$ with the arms $e^1$ on the vertical axis $e^2$, and to these axes flexible diaphragms, like those of a dry gas-meter, are connected.
Figure 2:
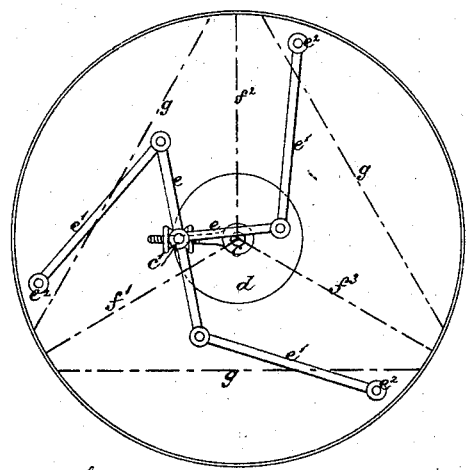
Figure 3:
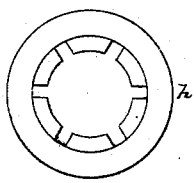
Fig. 3 is a plan, and Fig. 4 a transverse section. The two chambers on opposite sides of the same flexible diaphragm are connected with ports in the valve-seat diametrically opposite to each other.
Figure 4:
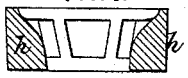
Figure 5:
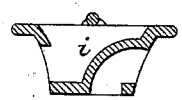
Figure 6:
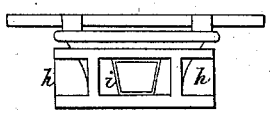
Figure 7:
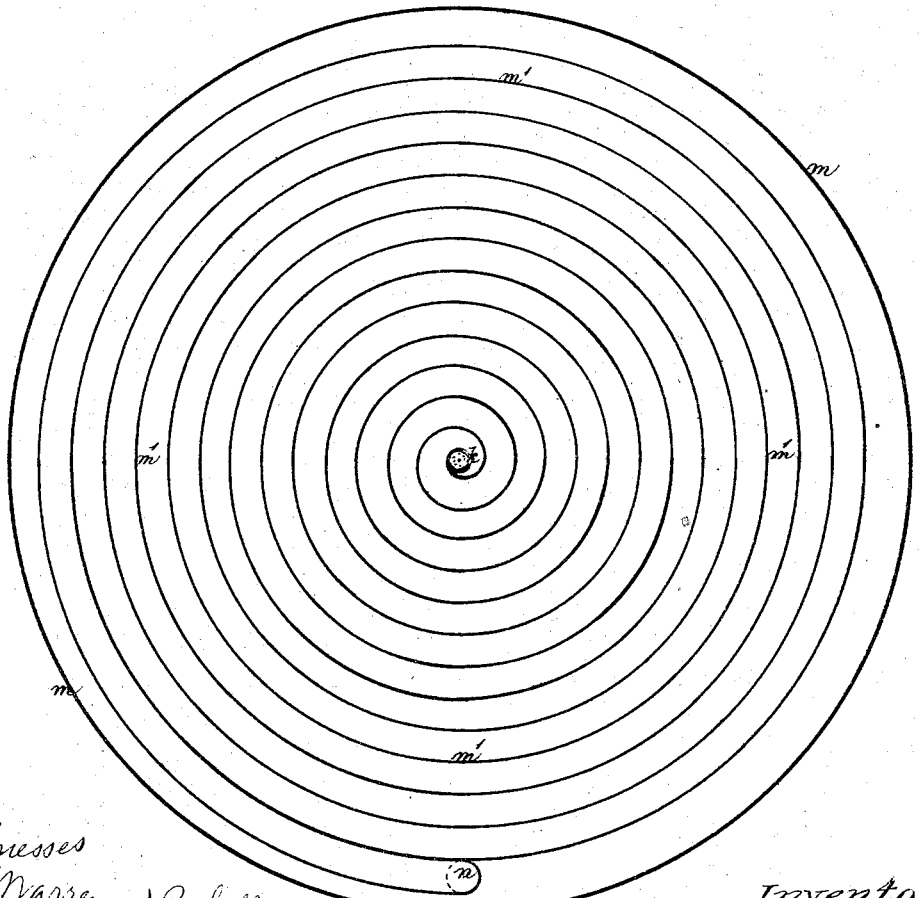

The valve $i$ is shown in section at Fig. 5, and a side view of the valve and valve-seat together at Fig. 6. The valve is rotated by the axis $c$, and it has two passages in it on opposite sides, one passing to the top of the valve and opening into the valve-chamber, and the other passing to the bottom of the valve, from whence the pipe $k$ passes. $l$ is a pipe, by which (so long as it is open) air can enter freely into the valve-chamber. By the action of the parts above described air is forced into the pipe $k$. It descends by this pipe into the base $m$ of the apparatus, which it enters at the center. The construction of the base is shown by the horizontal section, Fig. 7, taken on the line 2 2, Fig. 1. $m'$ is a spiral partition attached to the top plate, and descending so as to come in contact with the lower plate. The long channel thus formed is filled with cotton wool, through which the air entering it at $k$ has to permeate in order to reach the outlet $n$, at which is attached the pipe conveying the carbonized air away to be burned. $o$ is an oil-reservoir. It is a double cylinder surrounding the air-forcing chambers. It is closed at the top, and is charged with volatile hydrocarbon oil. A short pipe, $o^1$, descends from it into the base $m$, and another pipe, $o^2$, rises from the interior of the base from a point about a quarter of an inch from the bottom, and enters the top of the oil-reservoir. Thus, when the lower end of this pipe is uncovered, the oil descends out of the reservoirs into the base, and as soon as it is covered the flow ceases.

By the construction of the base or volatilizing-chamber in this manner an extensive surface of volatile oil is exposed to the air-current within a small compass. In order to prevent fluctuation in the quantity of hydrocarbon vapor taken up by the air, I clothe the base $m$ with a third non-conducting jacket of felt or other material.

Having thus described the nature of my said invention and the manner of performing the same, I would have it understood that I claim—

1. The combination and arrangement of the air-forcing apparatus, the hydrocarbon-reservoir, and the volatilizing-chamber, substantially as before set forth, the volatilizing-chamber being at the base of the machine, the hydrocarbon-reservoir being above the said chamber, and the air-forcing apparatus being at the upper part of the machine.

2. The combination of the following instrumentalities, viz: The air-forcing apparatus, the hydrocarbon-reservoir, the volatilizing-chamber, and the non-conducting jacket for the said chamber, substantially as before set forth.

3. The combination and arrangement of the following instrumentalities, viz: The volatilizing-chamber arranged at the base of the machine, the hydrocarbon-reservoir arranged above the volatilizing-chamber, the bird-fountain arrangement between the reservoir and the volatilizing-chamber, and the air-forcing apparatus arranged at the upper part of the machine and over the base containing the volatilizing-chamber.

J. F. G. KROMSCHROEDER.

Witnesses:
  G. F. WARREN,
  THOS. LAKE,
*Both of No 17 Gracechurch street, London.*